Oct. 19, 1937.  J. W. LEIGHTON  2,096,116
INDEPENDENT WHEEL SUSPENSION
Filed Feb. 16, 1934   2 Sheets-Sheet 1
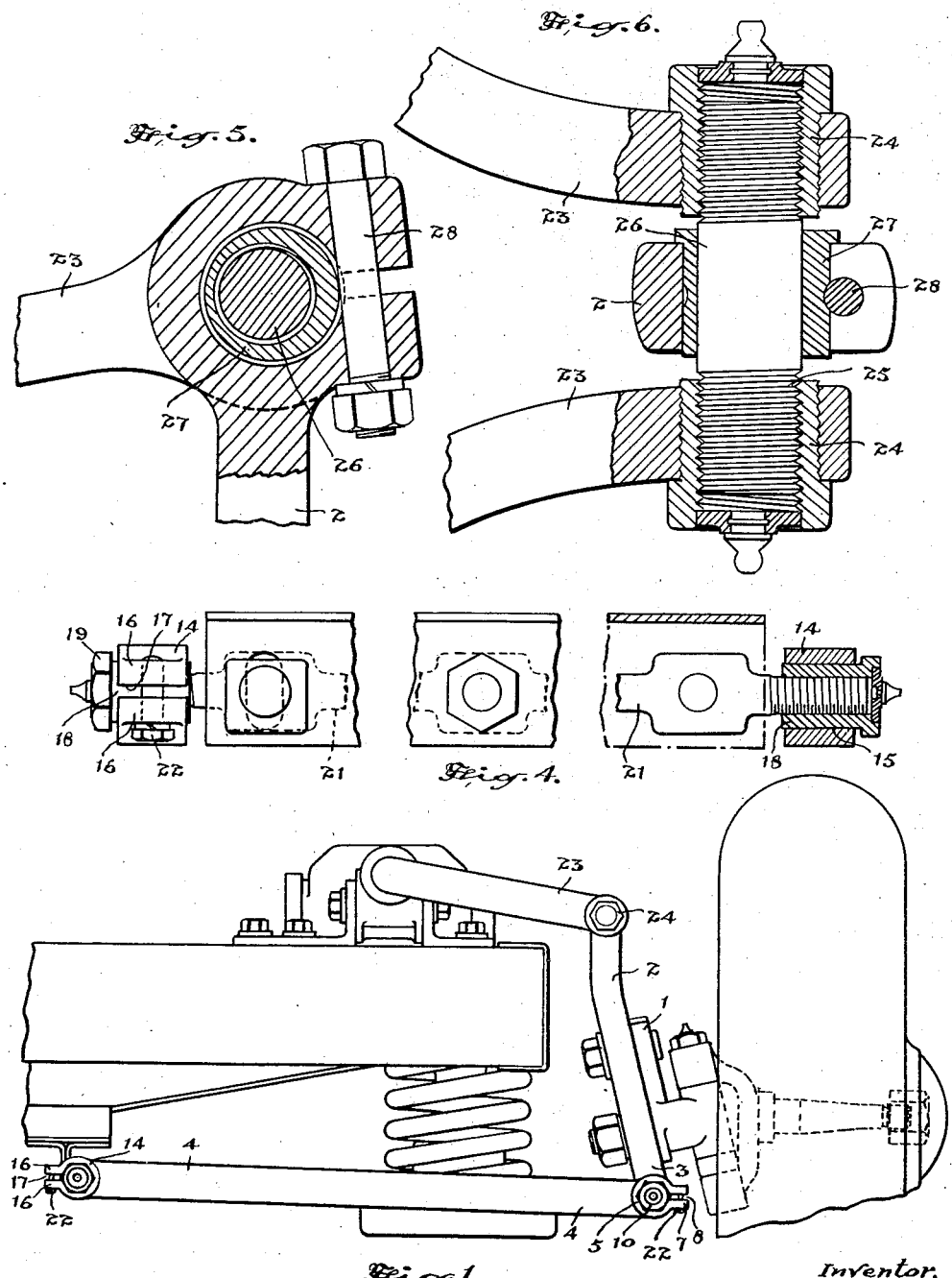

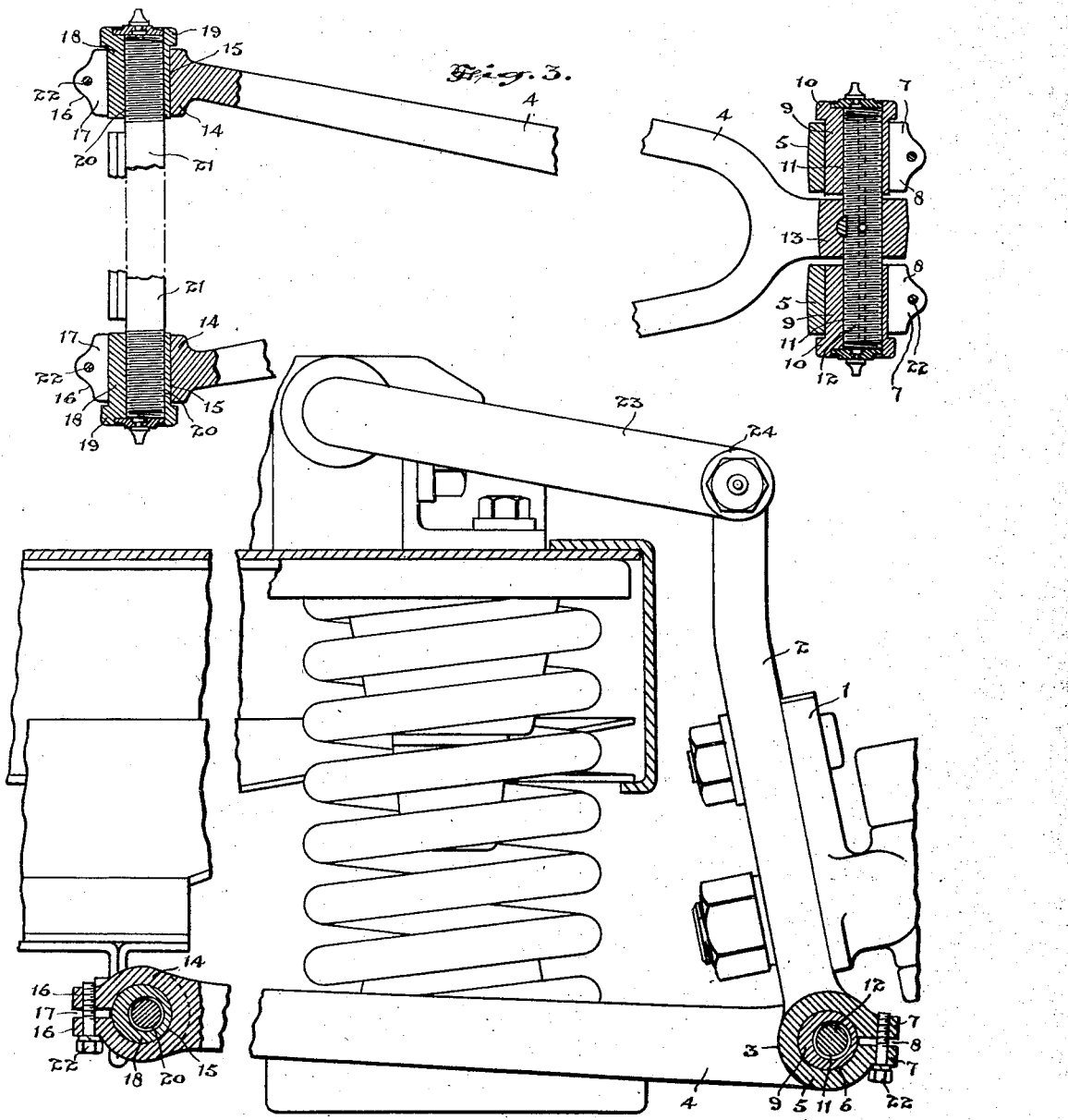

Patented Oct. 19, 1937

2,096,116

UNITED STATES PATENT OFFICE 2,096,116

INDEPENDENT WHEEL SUSPENSION

John Wycliffe Leighton, Port Huron, Mich.

Application February 16, 1934, Serial No. 711,506

2 Claims. (Cl. 280—124)

The principal objects of this invention are to facilitate the adjustment of the bearing supports of the pivotal arms connecting the wheel assemblies of a motor vehicle with the frame of the type of vehicle equipped with individual wheel suspensions so that the camber of the wheel assemblies may be readily adjusted and the various bearings brought into proper alignment without disconnecting the parts.

A further and very important object is to facilitate the alignment of bearings to relieve binding and stress and thus ensure long life and freedom of movement.

The principal feature of the invention consists in the novel construction and arrangement of the bearing bushings having internal threaded bearing surfaces and eccentrically arranged cylindrical outside surfaces at the inner or outer ends or both, of the pivotal arms connecting the wheels with the frame of the vehicle whereby the outer ends of said arms may be extended or retracted to adjust the "camber" of the wheel assemblies and whereby the transverse bearing supports of said arms may be aligned to relieve stress in said arms.

In the accompanying drawings, Figure 1 is a front elevational view of one half of a motor car frame and its individual wheel assembly to which the present invention is applied.

Figure 2 is an enlarged front elevational view showing the bearings at the inner and outer ends of the pivotal wheel suspension arms in section.

Figure 3 is a plan view on a reduced scale, of the lower suspension arm showing the bearing supports at the ends in section.

Figure 4 is an elevational view, in part section, of the inner end support for the lower suspension arm.

Figure 5 is an enlarged elevational detail of the outer end of the upper wheel support arms.

Figure 6 is an enlarged sectional detail of the part illustrated in Figure 5.

Numerous forms of individual wheel supports for motor vehicles have been devised in which each wheel assembly is supported by upper and lower arms pivotally mounted at their inner ends on the vehicle frame, and the outer ends are pivotally connected to the king pin bracket of the wheel assembly and this invention has been devised for such constructions, an example of which is shown and described in my co-pending patent Application 698,846, filed November 20, 1933.

In the construction herein shown the wheel assembly is provided with a king pin bracket 1 which has connected thereto a support 2 which has a bifurcated lower end 3 connected to the lower "wishbone" arm 4.

Each of the lug ends 5 of the bifurcated end of the member 2 is formed with a cylindrical orifice 6 and paired lugs 7 at each side of a longitudinal slot 8.

Within each orifice 6 is rotatably mounted a bushing 9 provided with a nut end 10 and having an eccentrically arranged threaded bearing orifice 11 extending longitudinally therethrough in which is rotatably mounted the threaded spindle 12 which is secured in the central lug end 13 of the "wishbone" arm 4.

The lug ends 14 at the inner ends of the "wishbone" arm 4 are each formed with a cylindrical orifice 15 and paired lugs 16 at each side of a longitudinal slot 17. In each slotted orifice is rotatably mounted a cylindrical bushing 18 provided with a nut head 19 and an eccentrically arranged threaded bearing orifice 20. A bar 21 adjustably mounted on the frame of the vehicle is formed with threaded bearing ends which engage the threaded bearings in the bushings.

When the vehicle is being assembled the eccentric bushings may be rotated at either or both ends of the "wishbone" arm to shorten or lengthen the said arm to provide the desired distance between the centres of the spindle 12 and bar 21 to give the required camber to the wheel. This form of adjustment is extremely simple and very accurate and when the desired adjustment is achieved the bushings are secured against rotation by tightening the clamping bolts 22 spanning the slotted lug ends.

This simple adjustment also permits a certain amount of adjustment for alignment of the bearings in each pair of lugs.

The upper wheel support arms 23 are each provided with threaded bushings 24 in which the threaded bearing pin 25 is mounted. This pin is here shown with a cylindrical center portion 26 on which is rotatably mounted an eccentric bushing 27 which is rotatable in the end of the upright wheel support 2. The upper end of said upright 2 is here shown slotted and provided with a clamping bolt 28 which holds the bushing in place. The bushing may be internally threaded and the pin 25 threaded from end to end if so desired. This arrangement at the upper end of the member 2, together with the adjustment of the lower "wishbone" arm permits an extraordinary adjustment of the vehicle wheels in a lateral direction for any desired degree of camber.

The parts are of simple, rugged and durable construction, easily and inexpensively mounted and allow of ready adjustment at any time without requiring any of the equipment being dismantled and they are easily readjusted when parts are dismantled for repair.

What I claim as my invention is:—

1. In a vehicle suspension system, in combination, a frame, a supporting means for a steering wheel spindle, means flexibly and adjustably connecting said supporting means with the frame including, a lower main support arm of rigid forked form pivotally connected at its outer convergent end to the lower end of said supporting means, and means pivotally connecting the inner divergent ends of said forked arm to the frame including an eccentric bushing adjustable to swing said entire forked arm into predetermined desired angular relation to the longitudinal centre line of the frame.

2. In a vehicle suspension system, in combination, a frame, a supporting means for a steering wheel spindle, means flexibly and adjustably connecting said supporting means with the frame including, a lower main support arm of rigid forked form pivotally connected at its outer convergent end to the lower end of said supporting means, and means pivotally and adjustably connecting each of the spaced divergent ends of said rigid forked arm to the frame including co-operatively paired eccentric bushings individually or collectively adjustable to enable a wide range of transverse and angular adjustment of said rigid forked arm relative to the longitudinal centre line of the frame and to permit relief from binding due to inaccuracies.

JOHN WYCLIFFE LEIGHTON.